United States Patent [19]

Sheibley et al.

[11] 4,018,971
[45] Apr. 19, 1977

[54] GELS AS BATTERY SEPARATORS FOR SOLUBLE ELECTRODE CELLS

[75] Inventors: Dean W. Sheibley, Sandusky; Randall F. Gahn, Columbia Station, both of Ohio

[73] Assignee: The United States of America as represented by the Administrator of the National Aeronautics and Space Administration, Washington, D.C.

[22] Filed: July 20, 1976

[21] Appl. No.: 707,124

[52] U.S. Cl. .............................. 429/105; 429/107; 429/190; 252/317
[51] Int. Cl.² ......................................... H01M 6/00
[58] Field of Search .......... 429/101, 105, 107, 190, 429/247, 252; 204/295; 252/315, 317

[56] References Cited

UNITED STATES PATENTS

| 3,392,103 | 7/1968 | Berger et al. ........................ 204/295 |
| 3,497,389 | 2/1970 | Berger et al. .................. 204/295 X |
| 3,497,394 | 2/1970 | Berger ................................ 429/190 |

*Primary Examiner*—Anthony Skapars
*Attorney, Agent, or Firm*—N. T. Musial; J. A. Mackin; John R. Manning

[57] ABSTRACT

Gels are formed from silica powders and hydrochloric acid. The gels can then be impregnated into a polymeric foam and the resultant sheet material can then be used in applications where the transport of chloride ions is desired. Specifically disclosed is the utilization of the sheet in electrically rechargable redox flow cells which find application in bulk power storage systems.

27 Claims, 4 Drawing Figures

U.S. Patent April 19, 1977 4,018,971
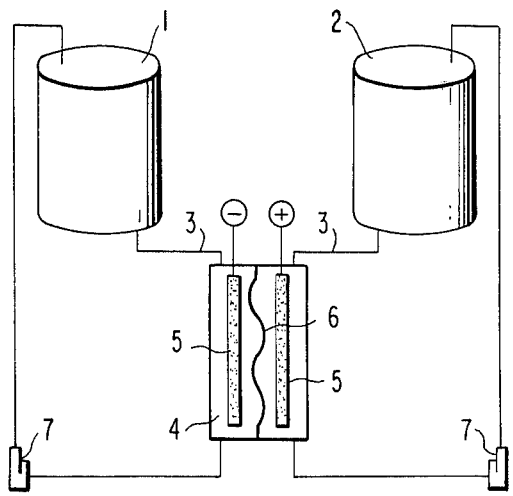
FIG.1
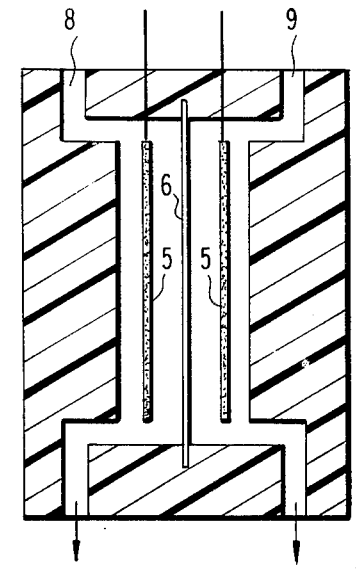
FIG.2
FIG.3
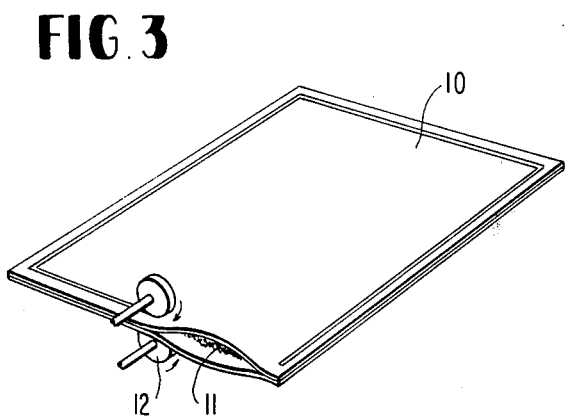
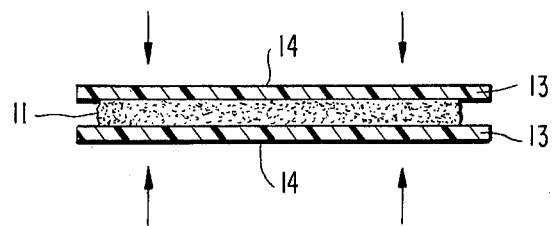
FIG.4

GELS AS BATTERY SEPARATORS FOR SOLUBLE ELECTRODE CELLS

ORIGIN OF THE INVENTION

This invention was made by an employee of the U.S. Government and may be manufactured or used by or for the Government without the payment of any royalties thereon or therefor.

BACKGROUND OF THE INVENTION

1. Field of the Invention

It has become increasingly important in recent years to develop means of storing bulk quantities of electrical power. Redox cells, having soluble electrodes in both the charged and discharged states, have been the object of increased interest as a method for the efficient storage of electrical energy. Such redox cells could store energy generated from time dependent energy sources such as solar electric and windmill electric installations.

2. Description of the Prior Art

Rechargable redox cells can be of the type which can be recharged by chemical or by electrical means. A chemical recharging cell can operate with the overall reaction sequence being the combination of carbon with oxygen to yield carbon dioxide. Thus, air would reoxidize ferrous ions to the ferric state or bromide ion to elemental bromine or the $Br_3^-$ ion on the cathode side while hot activated carbon beds would reduce the ferric ions to the ferrous state.

An electrically rechargable redox flow cell can be more efficiently utilized in conjunction with an electric generating installation such as a solar or windmill electric station. Electrically rechargable redox flow cells of the type in which the gels of the present invention are useful as separators are described in NASA Technical Memorandum TMX-71540 which is hereby incorporated by reference. In their simpliest embodiments, these redox flow cells contain two storage tanks, each containing one of the two metal ions which make up the redox couple. Although almost any redox couples can be used in such a cell, considerations regarding efficiency can be made in the choice of the particular couple. Thus, systems such as the $Fe^{+2}/Fe^{+3}//Ti^{+3}/Ti$-$O^{+2}$ and the $Fe^{+2}/Fe^{+3}//Cr^{+3}$ systems are preferred. Thus, the cathodic fluid, e.g., aqueous concentrated $Fe^{+3}$, and the anodic fluid, e.g., aqueous concentrated $Ti^{+3}$, are fed from their respective tanks through the redox flow cell wherein the system can either be charged from an external source or can be discharged to release the stored electrical energy. The power that can be withdrawn from or put back into the system depends on many factors including the tank volumes, the flow rates and the electrochemical features of the particular redox couple utilized and the characteristics of the electrode compartments.

In a two tank system employing multiple passes of the fluid, the fluid would constantly be recycled after passage through the fuel cell. In a four tank system, the fluids would pass from their respective tanks through the fuel cell and then into two other storage tanks. The system could then be electrically recharged by applying a suitable voltage to the terminals of the power conversion section section as the fluids are pumped back up to the original tanks.

The membrane utilized must provide an impermeable barrier to the cations of the particular couple utilized. However, the membranes must be permeable to the extent of maintaining the charge neutrality of each compartment by the migration of the anion used through the membrane. It should be noted that fuel cells can be designed with either anions or cations migrating through the membrane to provide the neutralization required. However, their is an inherent disadvantage from an energy standpoint in moving cations from the anode compartment during discharge as opposed to moving anions from the cathode compartment. That is, if a hydrogen cation is required to migrate during discharge, one mole of hydrochloric acid is required per Faraday over and above any acid that may be required for pH adjustment needed for solution stablilization.

Therefore, redox fuel cells that use anion migration through the membrane are somewhat preferred. Anions that can be used with the gels of the present invention include halide ions such as chloride and bromide.

Materials that have been used as anion-permeable membranes include polymers such as IONAC 3475. Such membranes can be made by grinding a quaternary ammonium ion-exchange resin to a powder and then polymerizing a monomer in the presence of the thus-formed powder. Additionally, a web can be used in conjunction with the membranes to provide support.

However, these organic membranes suffer from the significant disadvantages of limited temperature characteristics, limited resistance to prolonged exposure to oxidative acid environments and limited mechanical strength. Failure of the membrane to maintain the desired characteristics can result in increasingly high resistance values or leakage of one fluid into the compartment of the other.

Among the prior art membranes are those described in U.S. Pat. No. 3,497,389 issued to Carl Berger et al. These membranes utilize inorganic additives of controlled water vapor characteristics capable of retaining water and providing water vapor pressures above 100° C. The additives can be mixed with the ion conducting material, e.g., zirconium phosphate, granulated and pressed into discs which are then sintered.

Further, prior art structures include ceramic membranes such as those described in U.S. Pat. No. 3,392,103 issued to Carl Berger.

OBJECT OF THE INVENTION

An object of the present invention is a medium that can be used in the construction of a membrane for use in bulk electrical energy storage systems having low ionic resistivity high selectivity for anions as opposed to metal cations and low electronic conductivity.

A further object is a membrane composition having a high mechanical strength, good wetting characteristics, no current density or voltage effects and no polarizability.

A further object of the present invention is to provide a membrane which results in increased power delivery from a given system.

A further object of the present invention is a membrane which operates by a simple mechanism and avoids the use of ion-exchange resins.

A further object of the present invention is a membrane which is physically compatable with the environment of a flow cell to the extent of allowing prolonged exposure to an oxidative acid environment.

SUMMARY OF THE INVENTION

It has now been found that the use of a mineral-acid silica gel possesses the desirable characteristics of a low resistance and a high compatability with a fuel cell environment. This gel can be present in the membrane in a variety of modes, the preferred constructions being a foam sheet impregnated with the gel and a porous polymer envelope into which the gel is placed with the subsequent sealing of all sides of the envelope.

DESCRIPTION OF THE DRAWINGS

FIG. 1 shows an electrically rechargeable bulk power storage system. The anodic fluid and cathodic fluid tanks are represented by 1 and 2, respectively. Pipelines for the feeding operation to the redox flow cell are labelled 3. The redox flow cell 4 contains inert electrodes 5 and a selective membrane 6. After passing through the cell, the fluids are returned to tanks 1 and 2 by pumps labelled 7.

FIG. 2 represents a redox flow cell which can be used as 4 in FIG. 1. An anodic fluid, e.g., containing a $Ti^{+3}/TiO^{+2}$ couple, primarily in its reduced state of $Ti^{+3}$ ions is fed through inlet 8 while cathodic fluid, e.g., containing a $Fe^{+2}/Fe^{+3}$ couple, primarily in its oxidized state of $Fe^{+3}$ is fed through inlet 9. The fluids then contact the inert electrodes 5 which may be an inert substance such as a graphitized fabric or felt. The selective membrane 6 separates the compartments and permits passage of anions to maintain charge neutrality.

FIG. 3 represents a construction of a selective membrane 6 according to this invention. An envelope 10, sealed on three sides, of a microporous polymeric sheet is filled in with the gel 11 of the present invention after which the last side can be closed by conventional means such as heat sealing with heating rollers 12.

FIG. 4 shows a second construction of a selective membrane according to this invention. The gel 11 is placed between two sheets of polymeric material 13 and the composite is then pressed until the gel 11 is evidenced at the outer surfaces 14 of the sheets.

DETAILED DESCRIPTION OF THE INVENTION

It has now been found that gels comprising a gelling agent such as silica and a mineral acid such as hydrochloric acid can provide an excellent medium for the selective transference of ions. Although the gels of this invention find primary utility in the selective transference of halide ions such as chloride anions, the gels can, nevertheless, be easily put to use as a medium for the selective transference of hydrogen cations.

The gelling agents of this invention comprise inorganic materials such as silica and silicates including saponite, a magnesium lithium silicate, hectorite, a lithium aluminum silicate and magnesium zirconium silicate. These gelling agents can be used alone or in combination. However, the gelling agent composition as a whole should have an average particle diameter of less than about 0.1 microns. Therefore, the gelling agents of the present invention can be a wide range of silicas, talcs and clays.

Among the gelling agents, the use of silica and fumed silica in particular is preferred. A suitable fumed silicon dioxide is available from the Cabot Corporation under the name "Cab-O-Sil" which has a surface area of over about 100 square meters per gram. Although various silicates, talcs or clays have been used as the sole gelling agents in the gels of the present invention, it has been found that silica or silica in combination with these materials can provide preferred gels in view of their resulting in a lower resistance of the overall membrane. The resistance of the overall membrane is preferable less than about 0.5 ohms.

The acids which can be used in the gels of the present invention are mineral acids, preferably hydrochloric acid since the chloride ion is a preferred anion for use with the cation couples in the redox systems which have been proposed and used. The normality of a given volume of acid is inversely proportional to the amount of a given gelling agent needed to produce a gel. That is, as the normality of a given volume of acid increases, water is replaced by acid and, therefore, less gelling agent is needed to produce a gel. Thus, normalities of less than about 0.5 are disadvantageous in that increased amounts of the gelling agent are required which increases the resistance of the gel and thus the membrane as a whole. Further, normalities of more than about 12 are disadvantageous in that acid of such normalities can be described as "fuming" acids which have an adverse effect on the fuel cell and are difficult to handle. Therefore, the acids for use in the gels of th present invention have normalities between about 0.5 and about 12, preferably between about 6 and 12.

The gels of the present invention can easily be formed by simply adding the gelling agent in a sufficient amount to produce a gel of the desired consistency. The amount of gelling agent that must be added to a given weight of hydrochloric acid depends on the particular gelling agent used and especially on the particle size or surface area of the agent. Since a 6 to 12 normal hydrochloric acid solution is preferred, it has been found that the gelling agent should be added in an amount of about 5 to 40% by weight of the acid, depending on the particular agent utilized.

The gel can be used as an exchange medium in a variety of structures. Basically, the gel must either be enclosed in a micorporous envelope or must be impregnated into a micorporous sheet. An example of the envelope arrangement is shown in FIG. 3 wherein an envelope 10 is constructed from two sheets of a micorporous polymeric material. The envelope is sealed by any conventional means, e.g., heat sealing, on two or more sides and the gel 11 is then placed between the two sheets in a sandwich arrangement. Finally, the remaining open sides are then sealed by any conventional method which produces a tight seal. In FIG. 3, the last side is shown to be sealed by means of heated rollers 12. Suitable materials for the sheets to be fastened into envelopes include CELGARD 3400-a which is a microporous polypropylene film of a thickness of about 1 mil.

The microporous sheet material used to contain the gel of the present invention should have a void volume of at least about 40%, CELGARD having a void volume of about 60%.

A second structure which can be used to contain the gel of the present invention can be produced by a process shown in FIG. 4. In this arrangement, the gel of the present invention 11 is placed between two sheets 13 of a microporous material and pressure is applied to the outside surfaces 14 of the sheets in order to force the gel through the body of the sheets. When the gel is evident at the surfaces 14 of the sheet materials, the pressure is discontinued and the thus-formed structure can be used as a membrane within the scope of the present invention. Suitable micorporous sheet material which can be used in this arrangement include polyvinyl chloride foams such as the AMERACE foams produced by the Amerace Company of Butler, N.J. Such materials have been found to have a void volume of about 70%.

A third structure for containing the gel of the present invention can be produced by simply spreading the gel on one or both sides of a microporous sheet and wiping off excess gel. However, such arrangements are somewhat less satisfactory then the two structures mentioned above and shown FIGS. 3 and 4 since this method tends to result in an increase of the washing out of the gel from the structure during use in a flow cell.

It can be seen that the gels of the present invention can be used with other microporous materials such as microporous ceramic sheets.

The thickness of the membrane structure containing the gel of the present invention basically depends on the amount of resistance the system can tolerate in a practical sense. That is, in a given system, i.e., a specified flow cell with a given couple in a specified concentration, a higher power output will be obtained as the resistance of the membrane decreases in value. Thus, in a practical sense, the selection of the composition of the sheet materials as well as their thicknesses is made with a view toward the resistance of the final membrane product in a given redox flow cell.

The power of an electrical system is defined by the multiplication of the voltage by the current. It has unexpectedly been found that when using membranes containing the gels according to the present invention, consistently higher power outputs are obtained from a given cell over the output of the same cell using a commercial anion exchange membrane such as IONAC 3475.

The most preferred gelling agent has been found to be silica, such as the fumed silica available under the name "Cab-O-Sil", while the most preferred mineral acid is hydrochloric acid. Additonally, silicates such as magnesium zirconium silicate, magnesium lithium silicate or lithium aluminum silicate can be added in amounts up to about 5% by weight of the acid. The following Table indicates the amounts of "Cab-O-Sil" which should be added to a given weight of a hydrochloric acid solution to yield the gels of the present invention.

TABLE I

| 0.5 Normal HCl | 15 – 20% by weight of silica |
| 6.0 Normal HCl | 8 – 10% by weight of silica |
| 12 Normal HCl | 5 – 7% by weight of silica. |

As can be seen above, when using the "Cab-O-Sil" fumed silica which has a surface area of over 100 square meters per gram and a particle size of about 0.01 to 0.03 microns, the silica should be used in an amount from about 5 to about 20% by weight of the hydrochloric acid having a normality between 12 and 0.5.

While not wanting to be bound by theory, it is believed that the membranes containing the gels of the present invention operate by a mechanism whereby chloride ions contained in a compartment undergoing reduction, e.g., $Fe^{+3}$ to $Fe^{+2}$, enter the membrane and cause chloride ions contained in the membrane at the opposite side to be displaced into the other compartment which is experiencing an oxidation, e.g., $Cr^{+2}$ to $Cr^{+3}$. This mechanism indicates that the gel of the present invention could also be used in an application where the permeability of hydrogen cations is desired. However, as indicated above, such a system usually requires one mole of an acid such as hydrochloric acid per Faraday over and above any acid that might be required for pH adjustment needed for solution stablization.

The following non-limiting examples illustrate the use of the gels of the present invention.

EXAMPLE 1

10 grams of "Cab-O-Sil" brand fumed silica were added to 90 grams of a 6 Normal hydrochloric acid solution with mixing. After gellation occured, the gel was spread upon a sheet of Amerace brand microporous polyvinyl chloride foam having a thickness of about 20 mils. A second sheet of the polyvinyl chloride foam was then placed upon the first sheet and the laminate was pressed until the gel was evident at the surface of the polyvinyl chloride foam sheets. This structure had a total thickness of about 40 to 45 mils. and was used in a standard redox flow cell, the following output values being obtained.

TABLE II

| Time (in minutes) | Voltage | Current (in amperes) |
|---|---|---|
| 0 | .475 | .4 |
| 20 | .435 | .365 |
| 35 | .41 | .35 |
| 52.5 | .38 | .33 |
| 77.5 | .345 | .30 |
| 147.5 | .23 | .19 |
| 177.5 | .175 | .15 |
| 200 | .12 | .125 |
| 247.5 | .06 | .06 |

COMPARATIVE EXAMPLE 1

A commercially available Ionac 3475 membrane was placed in the flow cell used in Example 1 using the same anodic and cathodic fluids of the same concentration. The discharge characteristics of this cell were as follows:

TABLE III

| Time (in minutes) | Voltage | Current (in amperes) |
|---|---|---|
| 0 | .37 | .315 |
| 10 | .35 | .30 |
| 20 | .34 | .29 |
| 30 | .33 | .28 |
| 40 | .315 | .27 |
| 70 | .16 | .15 |
| 75 | .08 | .075 |
| 80 | .045 | .04 |

The cell body as shown in FIG. 2 is fabricated from polycarbonate plastic sheet (3 inches × 3 inches × ½ inch). Inert electrodes 5 of graphite sheet or graphite cloth (1½ inches × 1½ inches) are located in respective compartments of the cell in contact with the membrane 6. One electrode becomes the cathode, while the other becomes the anode depending on which reactant solution flows through each half cell compartment. Each electrode is sealed in the cell with a rubber gasket around its periphery.

Using the $Fe^{+3}/Fe^{+2}$ and $Ti^{+3}/TiO^{+2}$ couples, the Fe is the cathode and Ti is the anode. Typical salt concentrations are 1 molar with concentrations as high as 4 molar having been used. Data presented in Table II are for 1 molar solutions at room temperature discharging through a one ohm load resistor, which is not shown in the figure, connected to the electrodes 5 by suitable leads.

As can be seen above, the gel of the present invention can provide a membrane which can result in a significantly higher power output as compared with the prior art ion-exchange resin membranes.

EXAMPLE 2

A gel was formed by the procedure described in Example 1 with 90 grams of 6 Normal hydrochloric acid, 10 grams of "Cab-O-Sil" brand fumed silica and 5 grams of magnesium zirconium silicate. A membrane was made with the gel and two sheets of the polyvinyl chloride foam as described in Example 1. This membrane performed satisfactorily and gave output characteristics similar to those in Table II with a cell as described in Example 1.

EXAMPLE 3

A gel within the scope of this invention was formed by mixing 67.3 grams of saponite with 109 grams of 6 Normal hydrochloric acid. The output characteristics of a membrane formed from this gel in a manner similar to the procedure described in Example 1 were similar to the membrane formed in Example 1.

It can be seen that the gels of the present invention can provide an excellent medium for the selective transference of anions. These gels can be used in a variety of membrane structures which can be made by a considerable number of processes.

Therefore, it will be understood that various modifications and adaptions of the invention can be made by those skilled in the art without departing from the spirit of the invention and, accordingly, the invention is not taken as limited except by the scope of the following claims.

We claim:
1. An ion transport medium comprising a gel of hydrochloric acid and powdered silica.
2. The ion transport medium of claim 1, wherein said hydrochloric acid is from about 0.5 to about 12 Normal.
3. The ion transport medium of claim 1, wherein said powdered silica is present in an amount of from about 5 to about 20% by weight of said hydrochloric acid.
4. The ion transport medium of claim 1, wherein said gel further comprises a silicate.
5. The ion transport medium of claim 4, wherein said silicate is selected from the group consisting of magnesium lithium silicate, lithium aluminum silicate and magnesium zirconium silicate.
6. The ion transport medium of claim 1, wherein said powdered silica has a surface area of about 100 square meters per gram.
7. The ion transport medium of claim 1, wherein said powdered silica has an average particle size of less than about 0.1 micron.
8. An ionic transport membrane comprising a microporous substrate which contains an ion transport medium comprising a gel of hydrochloric acid and powdered silica.
9. The ionic transport membrane of claim 8, wherein said hydrochloric acid is from about 0.5 to about 12 Normal.
10. The ionic transport membrane of claim 8, wherein said powdered silica is present in an amount from about 5 to about 20% by weight of said hydrochloric acid.
11. The ionic transport membrane of claim 8, wherein said gel further comprises a slicate.
12. The ionic transport membrane of claim 11, wherein said silicate is selected from the group consisting of magnesium lithium silicate, lithium aluminum silicate and magnesium zirconium silicate.
13. The ionic transport membrane of claim 8, wherein said powdered silica has a surface area of about 100 square meters per gram.
14. The ionic transport membrane of claim 8, wherein said powdered silica has an average particle size of less than about 0.1 micron.
15. The ionic transport membrane of claim 8, wherein said microporous substrate has a void volume of over about 40% without said gel.
16. The ionic transport membrane of claim 8, wherein said microporous substrate is an organic polymer.
17. The ionic transport membrane of claim 8, wherein said membrane has a resistance of less than about 0.5 ohms.
18. An electrical storage device comprising an anode, an anodic fluid, a cathode, a cathodic fluid and between said anodic and cathodic fluid, an ionic transport membrane comprising a microporous substrate which contains an ion transport medium comprising a gel of hydrochloric acid and powdered silica.
19. The electrical storage device of claim 18, wherein said hydrochloric acid is from about 0.5 to about 12 Normal.
20. The electrical storage device of claim 18, wherein said powdered silica is present in an amount of from about 5 to about 20% by weight of said hydrochloric acid.
21. The electrical storage device of claim 18, wherein said gel further comprises a silicate.
22. The electrical storage device of claim 21, wherein said silicate is selected from the group consisting of magnesium lithium silicate, lithium aluminum silicate and magnesium zirconium silicate.
23. The electrical storage device of claim 18, wherein said powdered silica has a surface area of about 100 square meters per gram.
24. The electrical storage device of claim 18, wherein said powdered silica has an average particle size of less than about 0.1 micron.
25. The electrical storage device of claim 18, wherein said microporous substrate has a void volume of over about 40% without said gel.
26. The electrical storage device of claim 18, wherein said microporous substrate is an organic polymer.
27. The electrical storage device of claim 18, wherein said membrane has a resistance of less than about 0.5 ohms.

* * * * *